Dec. 15, 1964  R. E. HORN ETAL  3,161,465
PREPARATION OF STANNOUS HALIDES
Filed Nov. 13, 1961
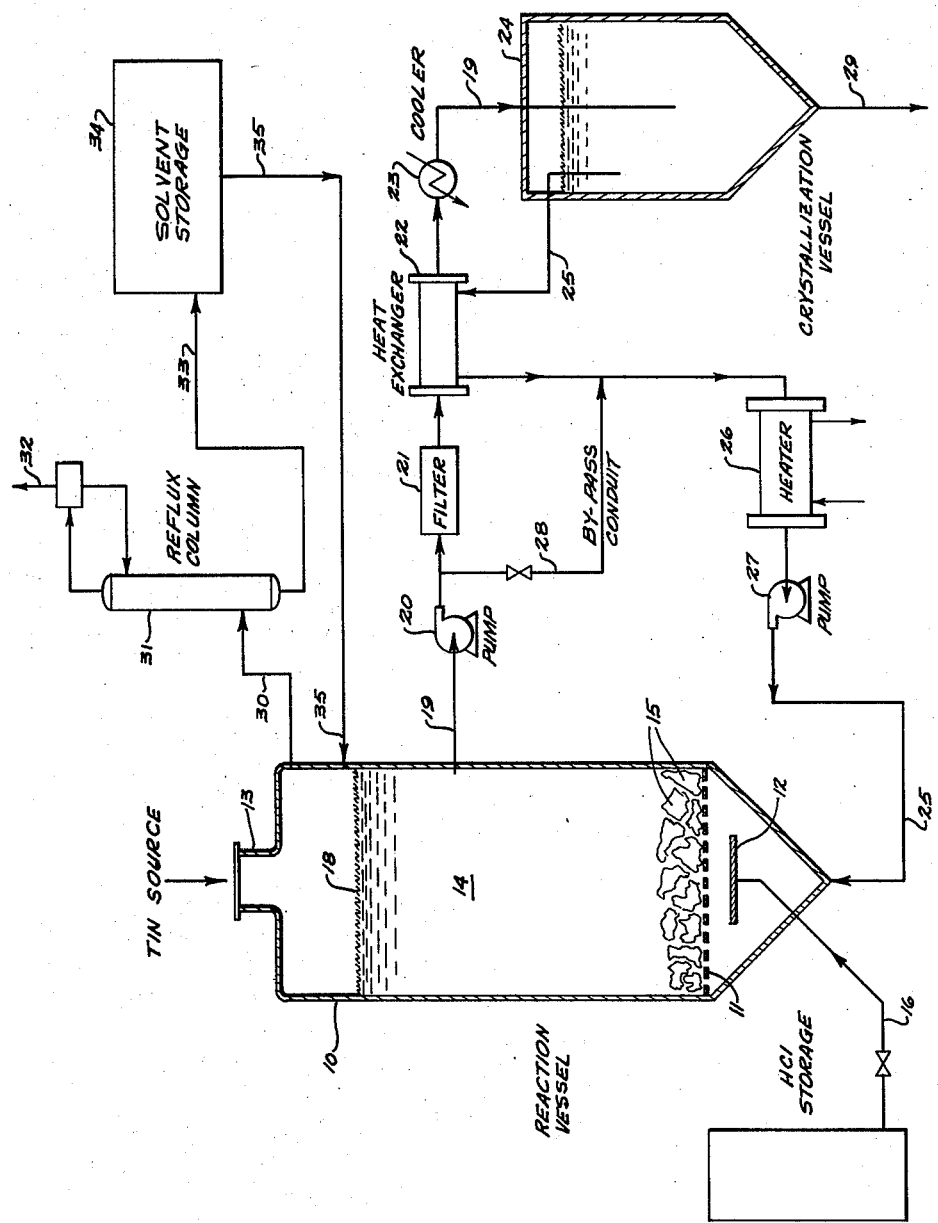
INVENTORS
RICHARD E. HORN
BY EDWARD B. STUART
Harry B. Keck
ATTORNEY 3,161,465
PREPARATION OF STANNOUS HALIDES
Richard E. Horn and Edward B. Stuart, Pittsburgh, Pa.,
assignors to Pitt Metals Company Incorporated, Pittsburgh, Pa., a corporation of Pennsylvania
Filed Nov. 13, 1961, Ser. No. 151,741
2 Claims. (Cl. 23—93)

This invention relates to the preparation of stannous halides. More particularly this invention is concerned with the selective preparation of stannous halides through the reaction of a hydrohalide acid with tin metal or tin sulfide immersed in a non-aqueous organic solvent.

According to the present invention, stannous halides can be obtained selectively in a high state of purity.

Stannous Chloride

Stannous chloride is a standard commodity of commerce which is utilized in various electroplating applications as a source of tin metal. In such applications there is a requirement that stannous chloride be substantially free of contamination with stannic chloride since the stannic chloride will not provide a usable source of electroplating tin. Instead any stannic chloride which enters into an electroplating bath will remain inert and will be discharged from the bath with the waste liquids. The usual commercial stannous chloride contains from 62.2 to 62.3 percent tin by weight. Absolutely pure stannic chloride contains 47.2 weight percent of tin; absolutely pure stannous chloride contains 62.6 weight percent of tin. The commercially available stannous chloride, having a tin content of about 62.2 to 62.3 weight percent, contains about 1 percent by weight of stannic chloride contamination.

Heretofore the preparation of chlorine salts of tin have been largely concerned with the production of stannic chloride which at one time found great utility in the textile industry as a reagent for the processing of silk. Accordingly there is a substantial history of processes which involve the reaction of chorine gas with tin metal for the express purpose of preparing stannic chloride to the substantial exclusion of stannous chloride. The early art teaches the need for maintaining a non-aqueous environment for the preparation of tin halides since the presence of moisture favors the formation of various tin halides in the hydrated form, e.g., stannic chloride dihydrate $SnCl_4 \cdot 2H_2O$. Numerous processes have been proposed for the reaction of tin metal with chlorine gas in the presence of liquid stannic chloride:

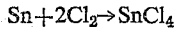
$$Sn + 2Cl_2 \rightarrow SnCl_4$$

In some proposals the stannic chloride was brought into contact with additional tin metal to form stannous chloride which dissolved in the excess stannic chloride:

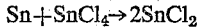
$$Sn + SnCl_4 \rightarrow 2SnCl_2$$

Thereafter the stannous chloride, dissolved in stannic chloride, was reacted with additional chlorine gas:

$$SnCl_2 + Cl_2 \rightarrow SnCl_4$$

The resulting product was substantially the stannic chloride.

Various non-aqueous solvents have been proposed for the preparation of *stannic chloride*, e.g., carbon tetrachloride, benzol, toluol and petroleum solvents.

The principal object of this invention is to provide a process for preparing stannous halide in a high state of purity.

A further object of this invention is to provide a continuous process for the preparation of stannous chloride from tin metal or tin sulfide.

These and other objects of this invention will become apparent from the following detailed description by reference to the accompanying drawing in which:

FIGURE 1 is a schematic flow-sheet illustrating a continuous process for the preparation of stannous chloride from tin metal or tin sulfide.

The present process differs from those of the prior art in the following respects:

(1) The tin metal or tin sulfide is reacted with hydrohalide acid in the presence of a non-aqueous solvent which is a suitable solvent for the hydrohalide acid and also is a suitable solvent for the resulting stannous halide. By utilizing hydrochloric acid in place of the chlorine gas of the prior art, the stannous chloride is selectively obtained to the substantial exclusion of stannic chloride. The product of the present process (stannous chloride) has a tin content of 62.6 weight percent indicating substantially pure stannous chloride.

(2) In contrast to the present high temperature techniques which are utilized in the preparation of stannous chloride, the present process utilizes relatively low temperatures at which there is no substantial tendency for the hydrochloric acid to oxidize the principal product, stannous chloride, to the higher state of oxidation in the form of undesirable stannic chloride.

(3) By utilizing non-aqueous solvents, there is no formation of the undesirable stannous chloride hydrates.

(4) By maintaining excess tin metal or tin sulfide in the reaction system at all times, the utilization of the hydrochloric acid is virtually complete and the preparation of stannous chloride is virtually quantitative.

(5) By conducting the present process in the absence of air, the formation of undesirable oxygenated side-reaction products is avoided. In the presence of air, stannous chloride readily forms various oxychlorides of tin.

Source of Tin

Tin metal or tin sulfide may be employed as the source of tin in this process. Where electrolytic tin metal is used, the product stannous halide is obtained in virtual chemical purity. Tin oxide is objectionable as a starting material since the product of reaction between tin oxide and hydrohalide acid is water which introduces objectionable side reaction products into the process.

As sources of tin, it is possible to utilize metal scrap which includes a substantial tin content. Where the other metal components of the tin-containing scrap are lower than tin in the electrochemical series, the present process will selectively result in the production of stannous chloride. It is also possible to select a solvent for the present process in which the halides of the other metals are relatively insoluble in order to utilize this process as a means for recovering selectively the tin metal in the form of stannous halide.

Non-Aqueous Solvent

The non-aqueous solvent of this invention must be a solvent for the hydrohalide acids which are reactants and also must be a solvent for the product stannous halide. The solvent must be inert with respect to the hydrohalide acid. In general alcohols, ketones, ethers and esters are preferred solvents. We have found that ethyl acetate is an excellent non-aqueous solvent for the following reasons:

(1) The ethyl acetate is readily obtainable in non-aqueous form;

(2) The ethyl acetate does not have a great tendency to absorb moisture from the atmosphere;

(3) The ethyl acetate is an excellent solvent for hydrohalide acids without being chemically attacked thereby;

(4) The ethyl acetate has a great solubility for stannous chloride at slightly elevated temperatures;

(5) The temperature-solubility curve for stannous chloride in ethyl acetate is quite sharp thereby permitting recovery of the dissolved stannous chloride through the relatively simple expedient of lowering the temperature of a solution of stannous chloride in the ethyl acetate to a level at which the stannous chloride content of the solution exceeds the solubility limit.

It should be emphasized that the non-aqueous environment specified for the practice of this invention is virtually absolute. In the presence of even infinitesimal quantities of water, the ethyl acetate solvent will be degraded by hydrohalide acid gas and convert to hydrolysis products. In addition to the needless loss of solvent, there is an accompanying formation of undesirable organo-tin compounds where moisture is present in the reaction system.

Anhydrous methanol may be utilized as the non-aqueous solvent provided that suitable precautions are exercised to maintain the anhydrous condition. Methanol has one virtue that is of practical value in addition to its relative cheapness; that is, methanol will not dissolve many of the readily available plastic materials of construction which are attacked by ethyl acetate. In order to maintain the methanol free of moisture, molecular sieves may be employed in recirculated methanol streams.

Other specific solvents which have been found to be acceptable for the present process include: ethanol, isobutyl alcohol, acetone, methyl-ethyl-ketone, methyl acetate. Attempts to utilize carbon tetrachloride as a solvent indicate that the stannous chloride formation occurs, but slowly in the presence of carbon tetrachloride as the solvent.

Hydrohalide Acid

Hydrochloric acid, hydrofluoric acid and hydrobromic acid are useful in the present process. Preferably the hydrohalide acid is supplied to the reaction zone in the form of a gas for solution into the solvent phase. Great care must be exercised to prevent moisture contamination of the hydrohalide acid. Air should be excluded from the acid supply since, as mentioned, the presence of air favors the formation of various oxyhalides which are undesirable.

Reaction Conditions

The present reaction proceeds at room temperature with some exothermic heat release. The preferred reaction temperature is from ambient room temperature to about 400° F. At greatly elevated temperatures, objectionable side reactions develop which adversely affect product purity. At unduly low temperatures, the solubility of the product stannous chloride in the organic solvents may be unduly low.

In general it is preferred to conduct the present reaction at a temperature below the boiling temperature of the specific solvent which is selected in order that the process may be carried out at substantially atmospheric pressure thereby avoiding any need for relatively expensive pressure-confining apparatus. Suitable heating and cooling coils usually will be provided to maintain the reaction temperature at a desired level. An initial increment of heat usually is preferable to commence the reaction. Thereafter some heat withdrawal is usually indicated to avoid the effects of the exothermic reaction.

The present process can perhaps be illustrated by describing an example of its application and results.

EXAMPLE

Thirty pounds of electrolytic tin metal was charged into a six-inch diameter column. The column was filled with ethyl acetate which was continuously recirculated throughout the column by means of a pump in a recirculation conduit. Hydrochloric acid gas was introduced into the bottom of the column at a rate of 0.33 cubic foot per minute (measured at 70° F. and 1 p.s.i.g.). During 2.5 hours of reaction, the temperature of the reaction column rose gradually to 142° F. as a result of the exothermic reaction of the hydrochloric acid gas and tin metal. The introduction of hydrochloric acid gas was continued for an additional 4.5 hours while the column reached temperature equilibrium at 144° F. By-product hydrogen gas was recovered from the top of the column throughout the reaction period.

After the described 7 hours of reaction time, 18.75 pounds of unreacted tin metal remained in the column. The total hydrochloric acid gas introduced into the column during the reaction period was calculated to be 14.05 pounds, or an excess of 21.8 weight percent. The ethyl acetate solution of hydrochloric acid and stannous chloride was removed from the column and flash-evaporated to remove the hydrochloric acid and the bulk of ethyl acetate. The remaining ethyl acetate solution of stannous chloride was evaporated to dryness.

The stannous chloride was obtained in the form of white crystals having a tin metal content of 62.6 percent by weight according to quantitative determinations, thus indicating the substantial purity of the product.

Throughout the above-described reaction, great care was exercised to maintain the reaction system free of moisture and free of exposure to air.

Continuous Processing

Referring to FIGURE 1, there is illustrated a reaction vessel 10 constructed from materials resistant to hydrohalide acid. The reaction vessel 10 should be vapor-tight to exclude air although the vessel 10 need not be adapted to accommodate superatmospheric pressures since it is preferred to carry out the present process at atmospheric pressure. A foraminous plate 11 extends across the vessel 10 near its base. A gas distribution outlet 12 is positioned beneath the foraminous plate 11 to discharge hydrohalide acid into the vessel 10. An opening 13 is provided in the top of the vessel 10 to allow for introduction (continuously or intermittently) of tin metal or tin sulfide. An inventory 14 of non-aqueous solvent is maintained within the vessel 10. Supported upon the foraminous plate 11 and immersed in the inventory 14 of non-aqueous solvent is a supply 15 of tin metal or tin sulfide.

A conduit 16 extends from the storage container 17 for hydrohalide acid to the gas distribution outlet 12.

Extending from the reaction vessel 10 beneath the upper level 18 of the inventory 14 of non-aqueous solvent is a conduit 19 which passes sequentially through a pump 20, a filter 21, a heat exchanger 22 and a cooler 23 to a crystallizer 24. The conduit 19 extends within the crystallizer 24 to a point adjacent to its base. The filter 21 serves to remove any undissolved matter from the fluid passing through the conduit 19. The heat exchanger 22 and the cooler 23 serve to lower the temperature of the fluid flowing through the conduit 19.

A conduit 25 extends from the crystallizer 24 from a point near the top thereof through the heat exchanger 22, a heater 26 and a pump 27 to the base of the reaction vessel 10. The heat exchanger 22 and the heater 26 serve to raise the temperature of the fluid flowing through the conduit 25. A valved by-pass conduit 28 communicates between the conduits 19 and 25. A conduit 29 extends from the base of the crystallizer 24 to deliver the stannous halide product of this invention.

A conduit 30 extends from the reaction vessel 10 at a point above the upper level 18 of the inventory 14 of non-aqueous solvent to a reflux column 31. Non-condensible gases are discharged from the reflux column 31 through a conduit 32. Condensible liquids from the reflux column 31 are delivered through a conduit 33 to a solvent storage vessel 34.

In operation a non-aqueous solvent according to this invention is introduced from the solvent storage vessel 34 by means of a conduit 35 into the reaction vessel 10 to provide the inventory 14 of non-aqueous solvent therein. A supply 15 of tin metal or tin sulfide is introduced continuously or intermittently into the reaction vessel 10 through the opening 13. Hydrochloric acid (for example) is introduced from the storage vessel 17 through the conduit 16 into the gas distribution outlet 12. The hydrochloric acid gas immediately dissolves in the non-aqueous solvent inventory 14 whereby the entire inventory 14 absorbs substantial quantities of the hydrochloric acid. The reaction vessel 10 is maintained at a temperature from about ambient room temperature to about 400° F. Preferably the temperature of the reaction vessel 10 is maintained below the boiling temperature of the non-aqueous solvent.

The hydrochloric acid, dissolved in the non-aqueous solvent, combines chemically with the tin metal to form selectively stannous chloride:

$$Sn + 2HCl \rightarrow SnCl_2 + H_2$$

Where tin sulfide is used in place of tin metal, hydrogen sulfide is produced as a by-product in place of hydrogen:

$$SnS + 2HCl \rightarrow SnCl_2 + H_2S$$

The stannous chloride is soluble in the non-aqueous solvent at the temperature which is maintained in the reaction vessel 10. Accordingly the stannous chloride product is immediately dissolved in the non-aqueous solvent inventory 14. The hydrogen gas (or hydrogen sulfide) which is formed as a by-product of the reaction is passed through the conduit 30 and the reflux column 31 and discharged from the system through the conduit 32.

After the present reaction has proceeded for a sufficient period of time to form a sufficient quantity of stannous chloride, a portion of the inventory 14 is withdrawn continuously or intermittently through the conduit 19 and delivered to the crystallizer 24 after being cooled in the heat exchanger 22 and the cooler 23. At the lowered temperature which is maintained within the crystallizer 24, the solubility of the stannous chloride in the non-aqueous solvent is diminished and the crystals of pure stannous chloride are precipitated for recovery as a slurry in the non-aqueous solvent through the conduit 29.

Supernatant clear non-aqueous solvent (containing some dissolved hydrochloric acid and some dissolved stannous chloride) is withdrawn from the crystallizer 24 through the conduit 25 and returned to the reaction vessel 10. The returned non-aqueous solvent is heated during its passage through the heat exchanger 22 and the heater 26.

By maintaining the reaction system of FIGURE 1 free of water, the formation of undesirable tin hydrates is avoided. The presence of water in the system would encourage deterioration of the non-aqueous solvent in the presence of the hydrochloric acid.

The reaction between tin metal or tin sulfide and the dissolved hydrochloric acid is exothermic and provides sufficient heat to offset the radiation and conductive losses of the reaction vessel 10. In fact, it may be necessary to provide cooling coils within the reaction vessel 10 to avoid overheating of the contents.

By virtue of the use of hydrochloric acid, hydrofluoric acid or hydrobromic acid in the present process, the formation of the higher tin halides (e.g., stannic chloride) is avoided.

According to the provisions of the patent statutes, we have explained the principle, preferred embodiment and mode of operation of our invention and have illustrated and described what we now consider to represent its best embodiment. However, we desire to have it understood that within the scope of the appended claims, the invention may be practiced otherwise than as specifically illustrated and described.

We claim:
1. The process for preparing stannous chloride which comprises maintaining an organic non-aqueous solvent in a reaction zone at a temperature in the range from ambient room temperature to about 400° F., maintaining said reaction zone substantially free of water and air,
   introducing a source of tin selected from the class consisting of tin metal and tin sulfide into said reaction zone,
   introducing anhydrous hydrogen chloride gas into said reaction zone beneath the level of said non-aqueous solvent,
   said organic non-aqueous solvent having a substantial solubility for hydrogen chloride gas without being chemically attacked by hydrogen chloride gas in the absence of water, said non-aqueous organic solvent further having a substantial solubility for stannous chloride at elevated temperatures,
   recovering from said reaction zone a solution of said organic non-aqueous solvent containing stannous chloride,
   introducing said solution into a crystallization zone at a temperature lower than that of the said reaction zone at which lower temperature the solubility of stannous chloride in said solvent is substantially decreased thereby to precipitate stannous chloride crystals in said crystallization zone,
   recovering from said crystallization zone a supernatant solution of stannous chloride in said solvent, and returning said supernatant solution to said reaction zone.

2. In the process of claim 1 wherein said organic solvent is selected from the class consisting of ethanol, methanol, acetone, methyl-ethyl-ketone, methyl acetate, ethyl acetate and isobutyl alcohol.

References Cited in the file of this patent
UNITED STATES PATENTS

| | | |
|---|---|---|
| 1,018,805 | Baillio | Feb. 27, 1912 |
| 2,047,545 | Buttfield | July 14, 1936 |
| 2,904,397 | Nielsen | Sept. 15, 1959 |
| 2,924,508 | Gilliland et al. | Feb. 9, 1960 |
| 2,955,914 | Gilliland et al. | Oct. 11, 1960 |

OTHER REFERENCES

Mellor: Comprehensive Treatise on Inorganic and Theoretical Chemistry, vol. 7, pages 424–8, 452–3 (1927), Longmans, Green and Co., N.Y.